(12) United States Patent
Saxena et al.

(10) Patent No.: US 8,498,295 B1
(45) Date of Patent: Jul. 30, 2013

(54) MODULAR LIGHTWEIGHT TUNNELING MECHANISMS FOR TRANSITIONING BETWEEN NETWORK LAYER PROTOCOLS

(75) Inventors: Tarun Saxena, Bangalore (IN); Reinaldo Penno, San Jose, CA (US); Satish Raghunath, Sunnyvale, CA (US); Mayuresh Bakshi, San Jose, CA (US); Suresh Kumar Vinapamula Venkata, Sunnyvale, CA (US); Ramakanth Gunuganti, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 282 days.

(21) Appl. No.: 12/952,908

(22) Filed: Nov. 23, 2010

(51) Int. Cl.
*H04L 12/56* (2006.01)
(52) U.S. Cl.
USPC ............................ 370/392; 370/522; 709/226
(58) Field of Classification Search
USPC .................................. 370/392, 522; 709/226
See application file for complete search history.

(56) References Cited

U.S. PATENT DOCUMENTS

| | | | |
|---|---|---|---|
| 6,523,068 B1 * | 2/2003 | Beser et al. .................... | 709/238 |
| 7,188,191 B1 | 3/2007 | Hovell et al. | |
| 2004/0052257 A1 * | 3/2004 | Abdo et al. ................... | 370/392 |
| 2006/0062248 A1 * | 3/2006 | Huang et al. .................. | 370/466 |
| 2007/0160065 A1 * | 7/2007 | Mundra et al. ........... | 370/395.52 |
| 2007/0198735 A1 * | 8/2007 | Kim et al. ..................... | 709/230 |

OTHER PUBLICATIONS

Durand et al., "Dual-Stack Lite Broadband Deployments Following IPv4 Exhaustion," draft-ietf-softwire-dual-stack-lite-06, Internet-Draft, Aug. 11, 2010, 35 pp.
Hankins et al., "Dynamic Host Configuration Protocol for IPv6 (DHCPv6) Options for Dual-Stack Lite," draft-ietf-softwire-ds-lite-tunnel-option-03, Internet-Draft, Jun. 24, 2010, 9 pp.
Brockners et al., "Gateway Initiated Dual-Stack Lite Deployment," draft-ietf-softwire-gateway-init-ds-lite-00, Internet-Draft, May 13, 2010, 15 pp.
Townsley et al., "IPv6 Rapid Development on IPv4 Infrastructures (6rd)," draft-ietf-softwire-ipv6-6rd-10, May 19, 2010, 20 pp.
Wikipedia entry, "Path MTU Discovery," last modified Sep. 16, 2010, 2 pp., http://en.wikipedia.org/wiki/Path_MTU_Discovery.
PowerPoint presentation, "Softwires," G6 Association, dated Sep. 22, 2008, 7 pp., http://www.afrinic.net/training/presentation/Slides%20Softwires.pdf.
Carpenter et al., "Connection of IPv6 Domains via IPv4 Clouds," RFC 3056, Feb. 2001, 20 pp.

(Continued)

*Primary Examiner* — Dang T. Ton
*Assistant Examiner* — Mewale Ambaye
(74) *Attorney, Agent, or Firm* — Shumaker & Sieffert, P.A.

(57) ABSTRACT

An example network system includes network interfaces, a data repository, a forwarding structure, a service element, and a forwarding element. The forwarding element is configured to receive a first packet having header information via a tunnel over the first network with one of the networking interfaces, pass the first packet to the service element, receive a second packet from the service element, and forward the second packet via the network interfaces to the second network, wherein the first packet conforms to the first network-layer protocol, and wherein the second packet conforms to the second network-layer protocol. The service element is configured to transform the first packet from a format conforming with the first network-layer protocol into the second packet having a format conforming with the second network-layer protocol, and direct the second packet to the forwarding element.

21 Claims, 6 Drawing Sheets

OTHER PUBLICATIONS

Despres, "IPv6 Rapid Deployment on IPv4 Infrastructures (6rd)," RFC 5569, Jan. 2010, 11 pp.

U.S. Appl. No. 12/964,473, by Olivier Vautrin, filed Dec. 9, 2010.

* cited by examiner

| SOFTWIRE TABLE | | |
|---|---|---|
| IPV6 SRC ADDR | IPV6 DEST ADDR | MTU VALUE |
| 2001:db8:0:0::1 | 2001:ac4:3:0::12 | 2048 |
| 2001:db8:0:0::7 | 2001:ac4:3:0::12 | 1440 |
| 2001:db8:0:0::1 | 2001:ad9:2:2::1 | 1960 |
| 2001:db8:0:1::4 | 2001:ac4:3:0::8 | 1280 |
| ••• | ••• | ••• |

FIG. 3

MODULAR LIGHTWEIGHT TUNNELING MECHANISMS FOR TRANSITIONING BETWEEN NETWORK LAYER PROTOCOLS

TECHNICAL FIELD

This disclosure relates to computer networks, and more specifically, deploying network-layer protocols across computer networks.

BACKGROUND

A computer network is a collection of interconnected devices that can exchange data and share resources according to one or more communication protocols. The communication protocols define the format and manner in which the devices communicate the data. Example protocols include the Transmission Control Protocol (TCP) and the Internet Protocol (IP) that facilitate data communication by dividing the data into small blocks called packets. These packets are individually routed across the network from a source device to a destination device. The destination device extracts the data from the packets and assembles the data into its original form. Dividing the data into packets enables the source device to resend only those individual packets that may be lost during transmission. The protocols define the format and construction of the packet, including header and payload portions of the packets.

Periodically, it is necessary to transition from one communication protocol to another. This may occur, for example, when a current communication protocol used within a network is upgraded to a newer version. As one example, the Internet is currently based on a communication protocol known as Internet Protocol version 4 (IPv4). IPv4 offers a ubiquitous network service, based on datagram (connectionless) operation, and on globally significant IP addresses to aid routing. It is becoming clear that certain elements of IPv4 are insufficient to support the growth of the Internet. For example, IPv4 makes use of a 32-bit address space. Internet Protocol version 6 (IPv6), however, makes use of a much larger 128-bit address space. However, development, standardization, implementation, testing, debugging and deployment of a new communication protocol can take a very large amount of time and energy, and is not guaranteed to lead to success.

A variety of approaches may be used in an attempt to provide a smooth transition from one communication protocol to another. One example approach that has been proposed is known as "dual-stack lite," as described in the Internet Engineering Task Force (IETF) draft "Dual-Stack Lite Broadband Deployments Following IPv4 Exhaustion" to A. Durand et al., Aug. 11, 2010, the entire content of which is herein incorporated by reference. According to this approach, a residential gateway located at a subscriber's premises acts as an ingress and egress for a tunnel that encapsulates IPv4 packets within IPv6 packets. These IPv4-over-IPv6 tunnels are commonly referred to as "softwires." The residential gateway forwards the IPv6 packets towards a router within a service provider network that decapsulates the IPv4 packets from the IPv6 packets, applies a network address translation (NAT) rule to each IPv4 packet, and forwards the IPv4 packets to the Internet.

In general, each router supports tens of thousands of subscribers. Conventionally, the router maintains a logical interface for each softwire and applies services on a per-subscriber basis. Traditional tunneling mechanisms used to create and maintain the softwires result in significant overhead due to the burden of signaling requirements for creating the softwires and associated logical interfaces, and a lack of mechanisms for detecting when subscribers login or logout. Furthermore, at a minimum, the router applies IPv4 to IPv4 NAT services for each subscriber as, according to the dual-stack lite model, subscribers need not have a globally unique network address. Applying the network address translation services as well as any other layer three through layer seven services requires additional hardware resources. Therefore, conventional dual-stack lite deployments require powerful hardware resources that may be very costly.

SUMMARY

In general, this disclosure is directed to techniques for providing lightweight tunneling mechanisms for transitioning between network-layer (i.e., layer three) protocols, where network-layer refers to the third layer of the Open Systems Interconnection (OSI) reference model. For example, this disclosure describes techniques by which a network device (e.g., a layer two network switch or a layer three router) utilizes a single logical interface to manage any number of different tunnels. More specifically, this disclosure describes techniques by which a service plane of the network device may provide tunneling services and network address translation services for transitioning packet flows between network-layer protocols seamlessly with the forwarding element of the network device. In one example, the forwarding element forwards a received packet to the service element for servicing and the service element applies the required services without further intervention from the forwarding element. The service element may be configured with additional modules that perform additional layer three through layer seven services, such as security, class of service, stateful packet inspection, and firewall services, prior to directing the packet to a forwarding element of the network device. That is, the techniques of this disclosure enable the service element to provide a modular, lightweight tunneling mechanism for transitioning between network-layer protocols seamlessly with the forwarding element.

In one example, a method includes receiving, with a network device, a packet having header information via a tunnel over a first network, wherein the packet conforms to a first network-layer protocol, and wherein the network device is connected to the first network operating in accordance with the first network-layer protocol and a second network operating in accordance with a second network-layer protocol, and directing the packet to a service element with a forward element of the network device. The method also includes accessing, with a forwarding element of the network device, a forwarding structure to select a logical interface to which to forward the packet based on the header information, wherein the logical interface is associated with a service element of the network device, and directing the packet to the service element with the forwarding element of the network device via the logical interface. The method further includes determining if an entry exists within a data repository of the network device that includes information about the tunnel based on at least the header information of the packet, in response to determining that the entry does not exist, creating the entry in the data repository to store information associated with the tunnel in order to establish the tunnel without signaling of the tunnel with a tunnel egress device, and in response to determining that the entry does exist, retrieving the entry from the data repository based on at least the header information of the packet. The method further includes t transforming, with the service element, the packet from a format conforming with the first network-layer protocol to a format conforming with the second network-layer protocol based on the entry, directing the packet from the service element to the forwarding element, and for forwarding the packet via the second network with the forwarding element.

In another example, a network system includes a first set of network interfaces configured to send and receive packets with a first network operating in accordance with a first network-layer protocol, a second set of network interfaces configured to send and receive packets with a second network operating in accordance with a second network-layer protocol, a data repository, a forwarding structure, a service element, and a forwarding element. The data repository is configured to store information about a set of tunnels. The forwarding structure stores a plurality of entries that each refers to one of a plurality of logical interfaces. The forwarding element is configured to receive a first packet having header information via a tunnel over the first network with one of the first set of networking interfaces, access the forwarding structure to select a logical interface to which to forward the packet based on the header information, pass the first packet to the service element via the logical interface, receive a second packet from the service element, and forward the second packet via the second set of network interfaces to the second network, wherein the first packet conforms to the first network-layer protocol, and wherein the second packet conforms to the second network-layer protocol. The service element is configured to, upon receiving the packet from the forwarding element, determine if an entry exists within the data repository that includes information about the tunnel based on at least the header information, in response to determining that the entry does not exist, creating the entry in the data repository to store information associated with the tunnel in order to establish the tunnel without signaling of the tunnel with a tunnel egress device, in response to determining that the entry does exist, retrieve the entry from the data repository based on at least the header information, transform the first packet from a format conforming with the first network-layer protocol into the second packet having a format conforming with the second network-layer protocol based on the entry based on the retrieved entry, and direct the second packet to the forwarding element.

In another example, a computer-readable storage medium is encoded with instructions for causing one or more programmable processors of a network device to receive a packet having header information via a tunnel over a first network, wherein the packet conforms to a first network-layer protocol, and wherein the first network operates in accordance with a first network-layer protocol, and determine if an entry exists within a data repository that includes information about the tunnel based on at least the header information. The instructions also cause the one or more programmable processors to access a forwarding structure stored with the network device to select a logical interface to which to forward the packet based on the header information, wherein the logical interface is associated with a service element of the network device, and direct the packet to the service element of the network device via the logical interface. The instructions also cause the one or more programmable processors to, in response to determining that the entry does not exist, create the entry in the data repository to store information associated with the tunnel in order to establish the tunnel without signaling of the tunnel with a tunnel egress device, and, in response to determining that the entry does exist, retrieve the entry from the data repository based on at least the header information. The instructions also cause the one or more programmable processors to transform the packet from a format conforming with the first network-layer protocol to a format conforming with a second network-layer protocol based on the entry, direct the packet from the service element to a forwarding element of the network device, and forward the packet via a second network, wherein the second network operates in accordance with the second network-layer protocol.

The techniques of this disclosure may provide one or more advantages. For example, the techniques described herein may allow a network device to utilize a single logical interface to manage any number of different tunnels (softwires) thereby eliminating the need to create a logical interface for each tunnel for which the network device provides ingress or egress. By reducing the number of logical interfaces that need to be established within the network device, the hardware requirements may be reduced, enabling less powerful and less expensive hardware to perform tasks that previously required more powerful and more expensive hardware. Furthermore, the techniques described in this disclosure may enable several different layer three through layer seven services to be added in a modular fashion to existing hardware within a service element of the network device such that multiple different services may be applied to packets received by the network device without requiring the packets to travel back and forth between the service element and the forwarding element of the network device. In this manner, the overhead associated with applying multiple services to a single packet may be reduced.

The details of one or more embodiments of the techniques of this disclosure are set forth in the accompanying drawings and the description below. Other features, objects, and advantages will be apparent from the description and drawings, and from the claims.

BRIEF DESCRIPTION OF DRAWINGS

FIG. 3 is a conceptual diagram illustrating an example softwire table consistent with this disclosure.

DETAILED DESCRIPTION

Figure 1:
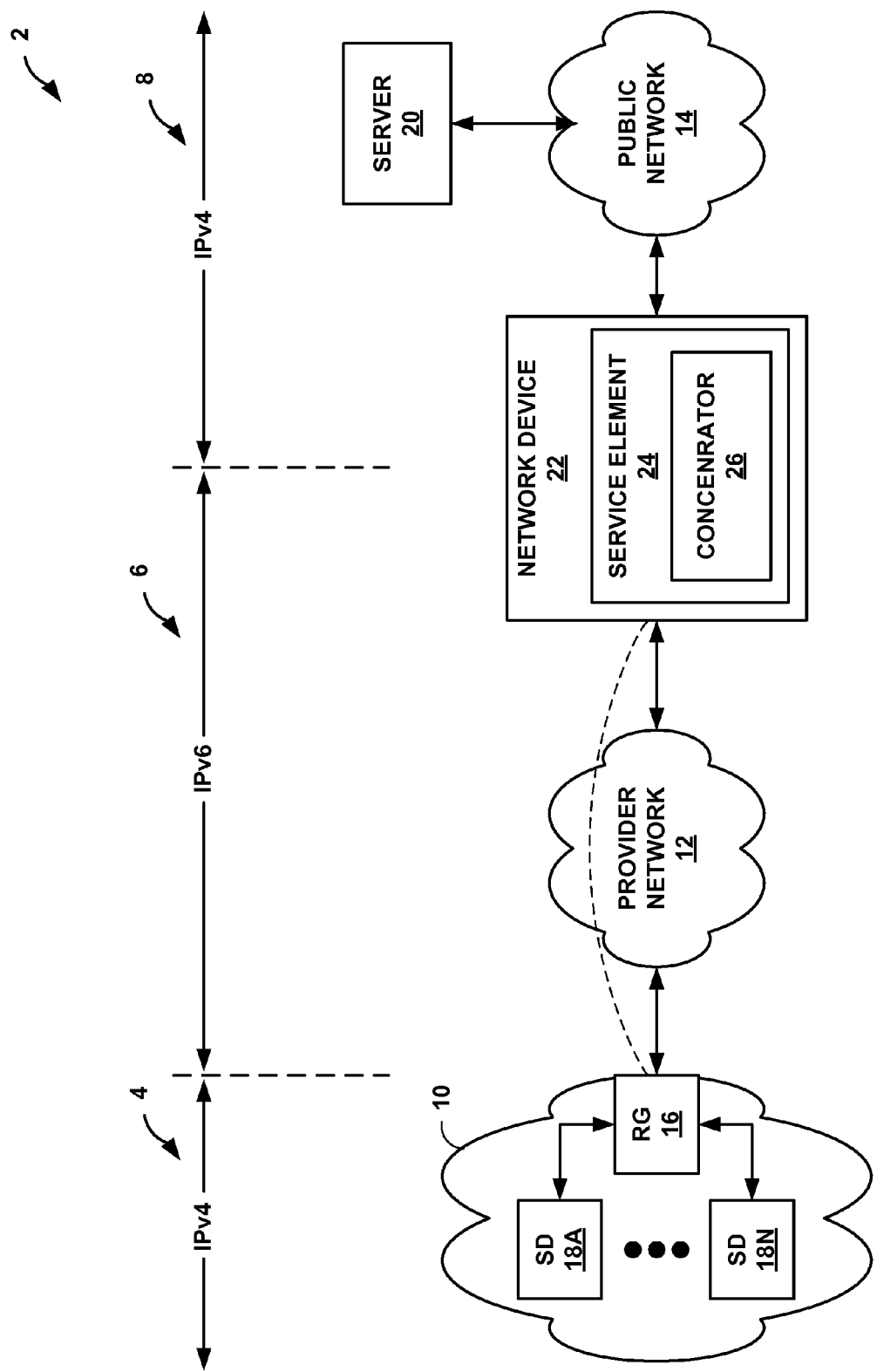
FIG. 1 is a block diagram illustrating an example network system that may implement the techniques of this disclosure.

FIG. 1 is a block diagram illustrating an example network system 2 in which subscriber devices (SD) 18A-18N (collectively, "subscriber devices 18) and server 20 exchange data. As illustrated in FIG. 1, network system 2 includes subscriber network 10, provider network 12, and public network 14. Each network within network system 2 may operate in accordance with one or more network-layer protocol (i.e., layer three of the OSI model). As illustrated in FIG. 1, different segments of network system 2 operate in accordance with different network-layer protocols. For example, network segments 4 and 8 operate in accordance with Internet Protocol version 4 (IPv4) as described in RFC 791, entitled "Internet Protocol" to Jon Postel et al., September 1981, the entire content of which is incorporated herein by reference. As another example, network segment 6 operates in accordance with Internet Protocol version 6 (IPv6) as described in request for comments (RFC) 2460, entitled "Internet Protocol, Version 6 (IPv6) Specification" to S. Deering et al., December 1998, the entire content of which is incorporated herein by reference.

As illustrated in FIG. 1, subscriber network 10 and public network 14 send and receive network messages in accordance with IPv4. Provider network 12 sends and receives network messages in accordance with IPv6. While described as implementing IPv6, provider network 12 may also implement IPv4 or a combination of IPv4 and IPv6. Similarly, although described as implementing IPv4, subscriber network 10 and public network 14 may also implement IPv6 or a combination of IPv4 and IPv6.

Subscriber network 10 includes residential gateway (RG) 16 and subscriber devices 18. Residential gateway 16 providers a gateway by which the subscriber devices 18 connect to provider network 12 and thereby access public network 14. Residential gateway 16 typically comprises a wireless router or other home networking device, such as a hub, a switch, a router, a cable modem, a digital subscriber line (DSL) modem or any other device that provides access or otherwise connects subscriber devices 18 to public network 14 or other wide area network (WAN). Typically, subscriber devices 18 are connected to residential gateway 16 via wired or wireless network protocols, such as Ethernet or 802.11g. Examples of subscriber devices 18 include personal computers, laptop computers, workstations, tablet computers, personal digital assistants (PDAs), wireless device, network-ready appliances, and the like.

Provider network 12 may represent a public network that is owned and operated by an Internet service provider (ISP) to provide network access to one or more subscriber devices 18. As a result, provider network 12 may be referred to herein as a service provider (SP) network. Provider network 12 may connect to one or more customer networks (e.g., subscriber network 10). While the example network system 2 illustrated in FIG. 1 includes one provider network 12, other examples may include multiple provider networks 12.

Public network 14 may comprise any set of one or more interconnected public networks, such as the Internet. Public network 14 may include other conventional network devices, such as routers, media gateways, switches, hubs, and network accelerators, to communicate data between subscriber devices 18 and server 20. Server 20 represents any device that provides one or more network resources accessible to subscriber devices 18. For example, server 20 may include email servers, domain controllers, web servers, print servers, printers, network copiers, gateways, intelligent switches, hubs, routers or other network access points or devices.

Network device 22 may comprise a layer two (L2) switch, a layer three (L3) router or another type of network device that facilitates the transfer of data within network system 2. In some examples, network device 22 may also perform bridging functions, firewall functions, intrusion detection functions, security functions, or other network functions. Further, although shown and described as providing L3 services, network device 22 may be any network element that provides services for other layers of the network stack. As one example, network device 22 may be a network router that integrates L2 and L3 services so as to provide L2 forwarding services as well as L3 routing functions. As shown in the example of FIG. 1, network device 22 is connected to provider network 12 and public network 14 and exchanges data between provider network 12 and public network 14. In other examples, network device 22 may be connected to subscriber network 10 and provider network 12. Generally, network device 22 may be placed at the edge of any access network, service provider network, or public network.

In accordance with the techniques of this disclosure, network device 22 is configured to provide an ingress and egress for packets tunneled from residential gateway 16 through provider network 12 to network device 22. Upon receiving a packet, network device 22 determines whether the packet requires one or more services to be applied to the packet based on header information included within the packet. If network device 22 determines that the packet requires services to be applied, network device 22 directs the packet to service element 24 of network device 22. While shown in FIG. 1 as being an internal element of network device 22, in other examples, service element 24 may be an external service device coupled to network device 22.

Service element 24 provides an operating environment for concentrator 26. Concentrator 26 maintains a data structure to store information about each tunnel including source and destination network addresses and adjustable packet parameter values (e.g., maximum transmission unit values) for each tunnel, for example. Upon receiving the packet, concentrator 26 performs a lookup on the data structure based on the header information included in the packet to determine if a tunnel that is associated with the packet already exists. If the lookup does not return any results, concentrator 26 determines that a tunnel associated with the packet does not exists and creates an entry in the data structure for the tunnel based on the packet header information and configurable default parameter values. If the lookup does return a result, concentrator 26 applies the retrieved information to encapsulate or decapsulate the packet as required. Concentrator 26 may also apply a network address translation (NAT) rule to change network address information included within the packet. After concentrator 26 applies the required services to the packet, network device 22 forwards the packet based on the packet header information. In some examples, service element 24 includes other modules (not shown in FIG. 1) that may be configured to apply other services to various packets, such as security, class of service, and firewall services without having to send the packet outside of service element 24.

Concentrator 26 may implement these techniques when converting network packets between a first network-layer protocol and a second network-layer protocol. In one example, network device 22 receives an IPv6 packet from residential gateway 16 via provider network 12. The IPv6 packet may be configured in accordance with a transitioning protocol, such as dual-stack lite (ds-lite) and may encapsulate an IPv4 packet. When the IPv6 packet is configured in accordance with the ds-lite protocol and encapsulates an IPv4 packet, the IPv6 tunnel is commonly referred to as an "IPv4-in-IPv6 softwire" or "softwire" for short.

According to the ds-lite approach, residential gateway 16 is assigned a public IPv6 network address and subscriber devices 18 are assigned private (e.g., not globally unique) IPv4 network addresses. When implementing the ds-lite approach, concentrator 26 performs both tunneling functionality as well as network address translation functionality. For example, when subscriber device 18A generates a packet directed to server 20, subscriber device 18A generates an IPv4 packet having a private IPv4 source address that corresponds to subscriber device 18A and a public IPv4 destination address that corresponds to server 20.

The IPv4 packet is sent from subscriber device 18A to residential gateway 16. Residential gateway 16 encapsulates the IPv4 packet within an IPv6 packet prior to forwarding it to network device 22 via provider network 16. When encapsulating the IPv4 packet inside the IPv6 packet, residential gateway 16 includes an IPv6 source address that corresponds to residential gateway 16 and an IPv6 destination address that corresponds to network device 22 while maintaining the IPv4 source and destination addresses established by subscriber device 18A. In this manner, residential gateway 16 tunnels the IPv4 packet across an IPv6 network (e.g., provider network 12) using a softwire. In some embodiments, residential gateway 16 need not first establish a tunnel with network device 22 using signaling or other techniques. Rather, the softwire between residential gateway 16 and network device 22 is automatically established when residential gateway 16 sends the IPv6 packet to network device 22.

Upon receiving the IPv6 packet, network device 22 examines the header information (e.g., the source IPv6 network address) and directs the IPv6 packet to service element 24 via a logical interface that corresponds to service element 24. Service element 24 directs the packet to concentrator 26, which then looks up information about the softwire associated with the packet in the data structure and processes the packet based on the retrieved softwire information and the packet header information. For example, concentrator 26 decapsulates the IPv4 packet from the IPv6 packet and applies a network address translation rule to change the source IPv4 address to the IPv4 address associated with network device 22. Network device 22 then forwards the packet to server 20 via public network 14.

When network device 22 receives a packet via public network 14 (e.g., from server 20), network device 22 examines the packet header information and determines what, if any, service need to be applied to the packet. For example, when the IPv4 destination address included in the packet header information is the IPv4 address of network device 22, network device 22 determines that the packet requires servicing and directs the packet to service element 24. Service element 24 directs the packet to concentrator module 26, which looks up the source IPv4 address and the port on which the packet was received in the data structure and retrieves the softwire information associated with the packet. Concentrator 26 then applies a network address translation rule to change the destination IPv4 address to the IPv4 address associated with subscriber device 18A and encapsulates the IPv4 packet within an IPv6 packet having an IPv6 destination address of residential gateway 16 and an IPv6 source address of network device 22. Residential gateway 16 receives the IPv6 packet from network device 22 via provider network 12, decapsulates the IPv4 packet from the IPv6 packet and forwards the packet to subscriber device 18A.

In this manner, network device 22 may utilize a single logical interface to manage any number of different softwires, thereby eliminating the need to create a logical interface for each tunnel managed by network device 22. By reducing the number of logical interfaces that need to be established within network device 22, the hardware requirements may be reduced, enabling less powerful and less expensive hardware to perform tasks that previously required more powerful and more expensive hardware. Furthermore, service modules that apply various layer three through layer seven services may be installed, in a modular fashion, on service element 24 of network device 22 (e.g., via a software update). The additional service modules may then apply different services to packets received by the network device without requiring the packets to travel back and forth between the service element and the forwarding element of network device 22.

Figure 2:
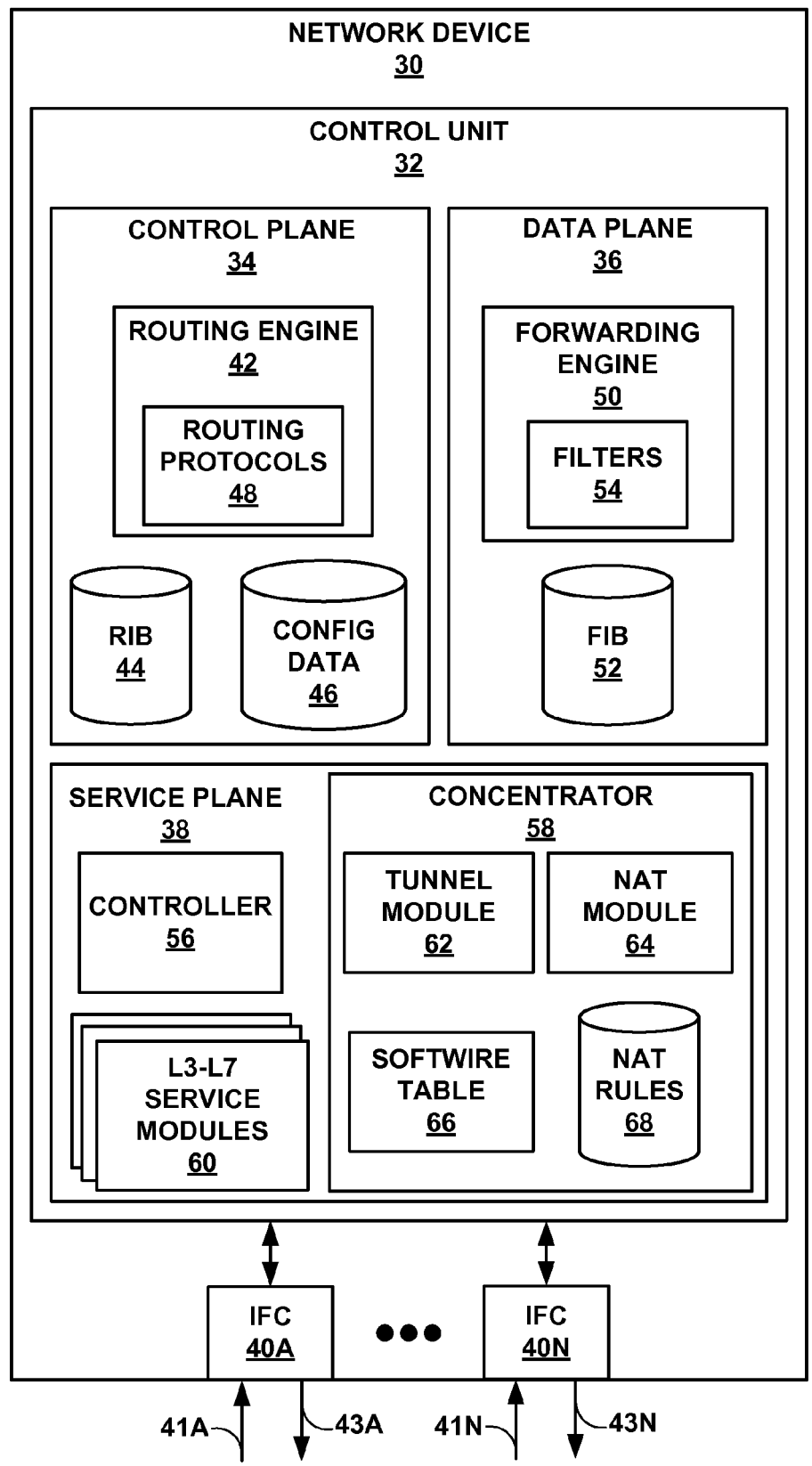
FIG. 2 is a block diagram illustrating an example network device that may implement the techniques of this disclosure.

FIG. 2 is a block diagram illustrating an example network device 30 that may implement the techniques of this disclosure. For purposes of illustration, network device 30 may be described below within the context of the example network system 2 of FIG. 1 and may represent network device 22. In this example embodiment, network device 30 includes control unit 32 and interface cards (IFCs) 40A-40N (collectively, "IFCs 40") that send and receive packet flows or network traffic via inbound network links 41A-41N (collectively, "inbound links 41") and outbound network links 43A-43N (collectively, "outbound links 43"). Network device 30 typically include a chassis (not shown in the example of FIG. 2) having a number of slots for receiving a set of cards, including IFCs 40. Each card may be inserted into a corresponding slot of a chassis for communicably coupling the card to a control unit 32 via a bus, backplane, or other electrical communication mechanism. IFCs 40 are typically coupled to network links 41 via a number of interface ports (not shown), and forward and receive packets and control information from control unit 32 via respective paths (which, for ease of illustration purposes, are not explicitly denoted in FIG. 2).

Control unit 32 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 32 may also be divided into three logical or physical "planes" to include a first control or routing plane 34, a second data or forwarding plane 36, and a third service plane 38. That is, control unit 32 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations. Often, control plane 34 may logical implement service plane 38 in that service plane 38 is provided as a virtual service plane executing within control plane 34. In this virtualized service plane implementation, control plane 34 may be considered to perform the functions attributed to service plane 38 below and in some instances this disclosure may ignore this virtualization and refer to concentrator 58 executing within control plane 34. In this respect, concentrator 58 may execute within either service plane 38 when a dedicated service plane 38 is implemented or within control plane 34 when service plane 38 executes as a virtualized service plane 38 in a virtual environment provided by control plane 34.

Control plane 34 of control unit 32 may provide the routing functionality of network device 30. In this respect, control plane 34 may represent hardware or a combination of hardware and software of control unit 32 that implements routing protocols 48 by which routing information stored within routing information base (RIB) 44 may be determined. The routing information may include information defining a topology of a network, such provider network 12. Control plane 34 may resolve the topology defined by the routing information to select or determine one or more routes through provider network 12. Control plane 34 may then update data plane 36 with these routes, where data plane 36 maintains these routes as forwarding information stored within forwarding information base (FIB) 52. Control plane 34, as illustrated in FIG. 2, also includes configuration data (CONFIG DATA) 46. Configuration data 46 may include device specific configuration information, which may be configured by an administrator. For example, configuration data 46 may include a default maximum transmission unit (MTU) value to use when determining the size of the packet processed by service plane 38.

Forwarding or data plane 36 may include forwarding engine (FE) 50, which may be implemented in hardware or a combination of hardware and software of control unit 32 that forwards network traffic in accordance with the forwarding information. Service plane 38 may represent hardware or a combination of hardware and software of control unit 32 responsible for providing and managing one or more services, such as tunneling and NAT service. Forwarding engine 50 may also include one or more tables of dynamical or static filters 54 stored locally within forwarding engine 50 (such as within a memory (not shown)). Filters 54 indicate particular actions to be performed when a packet is received that matches one of the filters. For example, an action may specify to send the packet to service plane 38. In one example, forwarding engine 50 examines the forwarding information stored in FIB 52 corresponding to the packet's routing instance and performs a lookup based on the packet's header information. In another example, forwarding engine 50 applies one of the dynamic or static filters 54 that corresponds to the packet header information.

Service plane 38 is one example of service element 24 of FIG. 1. While shown in FIG. 2 as an internal service element, in other examples, service plane 38 may comprise an external service element (e.g., an external service complex) coupled to network device 30 via one of IFCs 40. Service plane 38 providers an operating environment for controller 56 and service-related modules, including concentrator 58. Service plane 38 may include additional service-related modules, illustrated as layer three (L3) through layer seven (L7) service modules (L3-L7 SERVICE MODULES) 60. L3-L7 service modules 60 may perform one or more services, such as applying quality of service, caching, content delivery network, security, flow blocking, anti-virus (AV) scanning and detection, intrusion detection protection (IDP), firewall services, or other services relating to one or more of layers three through seven of the OSI model. Each service module of L3-L7 service modules 60 may be installed or configured as an individual module separately from others of L3-L7 service modules 60 and concentrator 58 (e.g., "plug-in" service modules into service element 38). In this manner, various different service modules may be combined to apply not only the lightweight tunneling and NAT techniques performed by concentrator 58, but also various other services as the packet is transformed from one network-layer protocol to another network-layer protocol.

Initially, upon powering up or otherwise enabling network device 30, control unit 32 loads, configures and executes concentrator 58 and any L3-L7 service modules 60 that may be configured within service plane 38. Controller 56 determines how the packet is to be processed by service plane 38 and may enable internal chaining of services. For example, controller 56 examines a received packet, determine that it needs to be processed by tunnel module 60 and NAT module 62 of concentrator 58.

Concentrator 58, as shown in FIG. 2, includes tunnel module 62, NAT module 64, softwire table 66, and NAT rules 68. Tunnel module 62, in general, encapsulates and decapsulates packets as required to tunnel the packets between residential gateway 16 and network device 22. In general, NAT module 64 applies NAT rules stored in NAT rules 68 to certain packets received via IFCs 40. One example of softwire table 66 is described in more detail with respect to FIG. 3. RIB 44, configuration data 46, FIB 52, softwire table 66, and NAT rules 68 may each store information in the form of one or more tables, databases, linked lists, radix trees, or other suitable data structure.

In some examples, controller 56 directs a packet to tunnel module 62 and, after tunnel module 62 processes the packet, tunnel module 62 passes the packet back to controller 56 and may also provide to controller 56 any additional information that may have been included in the packet header (e.g., information about the originating network device). Controller 56 examines the packet and any information that was included in the header and processes the packet based on the header information. For example, controller 56 may determine that the packet requires NAT servicing by NAT module 64.

In general, when network device 30 receives a packet via one of IFCs 40, e.g., IFC 40A, IFC 40A passes the packet to forwarding engine 50, including an indication of a port on which IFC 40A received the packet. Forwarding engine 50 inspects the packet to determine a destination of the packet, e.g., based on header information of the packet that includes an IP address of the destination. In particular, forwarding engine 50 may examine a five-tuple found within a header of each received packet or other information within the packet. The five-tuple may comprise a source IP address of the origination device, a destination IP address, a source port, a destination port, and a protocol identifier. Forwarding engine 50 may extract the five-tuple from the packet header and attempt to look-up the five-type in FIB 52 or in one or more tables of dynamic or static filters 54.

The forwarding information corresponding to the packet, or the matching filter 54, may specify that the packet needs to be forwarded to a next-hop via one of IFCs 40 or to service plane 38. In examples where the packet needs to be forwarded to service plane 38, forwarding engine 50 forwards the packet to service plane 38 via a logical interface that corresponds to service plane 38. Service plane 38 receives the packet and controller 56 examiners the packet to determine which services need to be applied to the packet. When the packet is received from residential gateway 16 and configured in accordance with the ds-lite approach, the packet is configured as an IPv6 packet and includes an IPv6 source address that is set to the IPv6 address of residential gateway 16 and an IPv6 destination address that is set to the IPv6 address of network device 30. Based on at least one of the IPv6 source address, the IPv6 destination address, and the port on which the packet was received, controller 56 determines that the packet needs to be processed by tunnel module 62.

Tunnel module 62 receives the IPv6 packet from controller 56 and performs a lookup within softwire table 66 to determine if a softwire exists for the packet. In one example, tunnel module 62 performs the lookup based on the IPv6 source address and the IPv6 destination address included within the packet. If no match is found, tunnel module 62 creates an entry in softwire table 66, thus automatically creating the softwire between the residential gateway (e.g., residential gateway 18 of FIG. 1) and network device 30 upon receiving the first packet associated with the softwire. When creating a new entry in softwire table 66, tunnel module 62 may include certain preconfigured values (e.g., a default MTU value) that are stored in configuration data 46 and may also be stored within a data structure that is local to service plane 38 (not shown in FIG. 2) and may include a subset of the configuration information stored within configuration data 46. If a match is found in softwire table 66, tunnel module 60 retrieves the information, decapsulates the IPv4 packet from the IPv6 packet, and, in some instances, determines the size of the IPv4 packet based on an MTU value retrieved from softwire table 66.

After servicing the packet, tunnel module 62 returns the packet to controller 56. Controller 56 examines the IPv4 packet header information (e.g., the IPv4 source address and the IPv4 destination address) to determine if any additional services need to be applied to the packet. Continuing the example where the packet was received from residential gateway 16 and configured according to the ds-lite approach, controller 56 determines that the packet further requires service by NAT module 64 and directs the packet to NAT module 64.

NAT module 64 examines the packet and determines which NAT rule of NAT rules 68 to apply to the packet based on the header information included in the packet as well as the port of the one of IFCs 40 on which the packet was received. In one example, NAT module 64 applies a NAT rule that changes the IPv4 source address from the private IPv4 address of the one of subscriber devices 14A from which the packet originated to the public IPv4 address of network device 22. In another example, NAT module 64 applies a different NAT rule that changes the IPv4 destination address from the public IPv4 address of network device 22 to the private IPv4 address of one of subscriber devices 14A. After NAT module 62 finishing processing the packet, NAT module 62 returns the packet to controller 56.

Controller 56 examines the packet again and determines if any additional services need to be applied by one or more of L3-L7 service modules 60 of service plane 38. If the packet requires additional services, controller 56 directs the packet to each of the service modules as required. If no additional services need to be applied to the packet, controller 56 returns the packet to forwarding engine 50. Forwarding engine 50 inspects the packet to determine the destination of the packet and forwards the packet over the appropriate one of IFCs 40 to a next-hop (e.g., a network device located within public network 14). In this manner, multiple services may be performed by several different service modules without requiring multiple trips between forwarding engine 50 and service plane 38.

In an example where network device 30 receives an IPv4 packet from public network 14 via one of IFCs 40, e.g., IFC 40N, IFC 40N passes the packet to forwarding engine 50, including an indication of a port on which IFC 40N received the packet. Forwarding engine 50 inspects the packet to determine a destination of the packet as described above. In examples where the packet needs to be forwarded to service plane 38, forwarding engine 50 forwards the packet to service plane 38 via a logical interface that corresponds to service plane 38 (e.g., the same logical interface that corresponds to the service plane as described above). Service plane 38 receives the packet and controller 56 examiners the packet to determine which services need to be applied to the packet. In this example, the packet is received via public network 14, includes an IPv4 source address of server 20 and an IPv4 destination address of network device 22. Based on at least one of the IPv4 source address, the IPv4 destination address, and the port on which the packet was received, controller 56 determines that the packet needs to be processed by NAT module 64.

NAT module 64 receives the packet from controller 56 and determines which NAT rule stored in NAT rules 68 needs to be applied to the packet to change the IPv4 destination address from the public IPv4 address of network device 30 to the private IPv4 address of the appropriate one of subscriber devices 18. When applying the appropriate one of NAT rules 64, NAT module 64 determines the private IPv4 address to which to change the IPv4 destination address. After applying the NAT rule and changing the IPv4 destination address, NAT module 64 returns the packet to controller 56.

Controller 56 examines the updated packet, determines that the packet requires services applied by tunnel module 62, and passes the packet to tunnel module 62. Tunnel module 62 receives the packet and performs a lookup on softwire table 66 to determine the tunnel parameters for the softwire associated with the packet. The tunnel parameters may include the public IPv6 destination address of residential gateway 16 and an MTU size. For example, where the IPv4 destination address is one of subscriber devices 18, tunnel module 62 sets the IPv6 destination address of the IPv6 packet that encapsulates the IPv4 packet to the IPv6 address of residential gateway 16. Tunnel module 62 sets the IPv6 source address of the IPv6 packet to the IPv6 address of network device 30. After encapsulating the IPv4 within the IPv6 packet, tunnel module 62 returns the packet to controller 56.

Controller 56 examines the IPv6 packet and determines if any additional services need to be applied by one or more of L3-L7 service modules 60. If the packet requires additional services, controller 56 directs the packet to each of the service modules as required. If no additional services need to be applied to the packet, controller 56 returns the packet to forwarding engine 50. Forwarding engine 50 inspects the packet to determine the destination of the packet and forwards the packet over the appropriate one of IFCs 40 to a next-hop (e.g., a network device located within provider network 12).

While tunnel module 62 and NAT module 64 are shown as two separate modules within concentrator 58 in FIG. 2, in some examples, the functionality of tunnel module 62 and NAT module 64 may be combined in a single module (e.g., a concentrator module). For example, the combined module may apply the encapsulation/decapsulation and NAT services to the packet using a single lookup of softwire table 66 and NAT rules 68. Furthermore, while the packet is described as receiving tunnel and NAT services prior to receiving other services that may be performed by other modules of service plane 38, it is contemplated that other services (e.g., security services and firewall services) may be applied to the packet prior to the packet receiving the tunnel and NAT services.

In some examples, after forwarding engine 50 forwards the packet over the appropriate one of IFCs 40 to a next-hop, network device 30 receives an Internet Control Message Protocol (ICMP) error message indicating that the packet is too big (i.e., the MTU value is set too high). Typically, the ICMP error message includes a suggested, lower, MTU value to use when sending packets (e.g., the maximum segment size). In one example, forwarding engine 50 directs the error message to service plane 38 and controller 56. Controller 56 then updates the MTU value field of softwire table 66 associated with the packet that triggered the ICMP error message to the suggested MTU value included in the ICMP error message. When the packet re-sent, the packet size is adjusted to the smaller MTU value stored in the softwire table 66 entry associated with the softwire.

After re-sending the packet, network device 30 may receive additional ICMP error messages. The MTU value associated with the softwire is further reduced based on the suggested MTU values included in the ICMP error messages until the packet is successfully received by the destination network device. When the softwire is removed, the MTU value assigned to the softwire resets to a default value (e.g., a value configured by an administrator and stored in configuration data 46). In this manner, the techniques enable an administrator to set an optimistically high default MTU value while providing a passive way to automatically reduce the MTU value when the default value is too large without requiring any changes to end-hosts (e.g., subscriber devices 18 and server 20).

FIG. 3 is a conceptual diagram illustrating an example softwire table 70 consistent with this disclosure. For purposes of illustration, softwire table 70 may be described below within the context of example network device 30 of FIG. 2 and example network system 2 of FIG. 1 and may represent softwire table 66. In this example embodiment, softwire table 70 includes an IPv6 source address (IPV6 SRC ADDR) column 72, an IPv6 destination address (IPV6 DEST ADDR) column 74, and an MTU value column 76. As discussed above, tunnel module 62 may use information from softwire table 70 to determine various parameters, including MTU values, associated with a softwire based on, for example, the IPv6 source address and the IPv6 destination address.

Softwire table 70 includes four example entries, represented as rows. The first row of softwire table 70 includes IPv6 source address "2001:db8:0:0::1," IPv6 destination address "2001:ac4:3:0::12," and MTU value "2048." In the example of FIG. 3, the first row may be created by tunnel module 62 when network device 30 received an IPv6 packet configured in accordance with the ds-lite approach from a residential gateway (e.g., residential gateway 16 of FIG. 1).

The values included in the rows are extracted from IPv6 packets received and the rows are created by tunnel module 62 upon receiving an initial packet of a softwire. For example, the values stored in the first row are reflective of the values included in the initial IPv6 packet received from residential gateway 16. Residential gateway 16 is assigned the public IPv6 address "2001:db8:0:0::1," which is included in the IPv6 packet received by network device 30 as the IPv6 source address. Network device 340 is assigned the public IPv6 address "2001:ac4:3:0::12," which is included in the IPv6 packet received by network device 30 as the IPv6 destination address. The MTU value stored in the first row may be a default MTU value configured on network device 30 by an administrator or an MTU value determined based on one or more ICMP error messages received by network device 30.

In one example, network device 30 receives a packet from residential gateway 16 via provider network 12 and directs the packet to service plane 38 and controller 56, which passes the packet to concentrator 58 and tunnel module 62. The packet includes an IPv6 source address of "2001:db8:0:1::4" and an IPv6 destination address of "2001:ac4:3:0::8." In one example, tunnel module 62 performs a lookup in softwire table 70 based on the IPv6 source address and the IPv6 destination address. Tunnel module 62 retrieves the information from the row that matches the lookup, row four in this example because the IPv6 source address matches the IPv6 source address stored in the fourth row of the IPv6 source address column 72 and the IPv6 destination address matches the IPv6 destination address stored in the fourth row of the IPv6 destination address column 74. Tunnel module 62, after decapsulating the packet, applies the retrieved MTU value to the packet prior to returning the packet to controller 56.

In accordance with one embodiment, the entries in softwire table 70 may age out after a configurable period of time. That is, if a packet associated with a softwire having an entry in softwire table 70 is not received by network device 30 after the configurable period of time, the entry is automatically removed from the table. An administrator may configure the period of time that passes after receiving the last packet associated with the softwire prior to the entry being removed and the period of time may be stored in configuration data 46.

Figure 4:
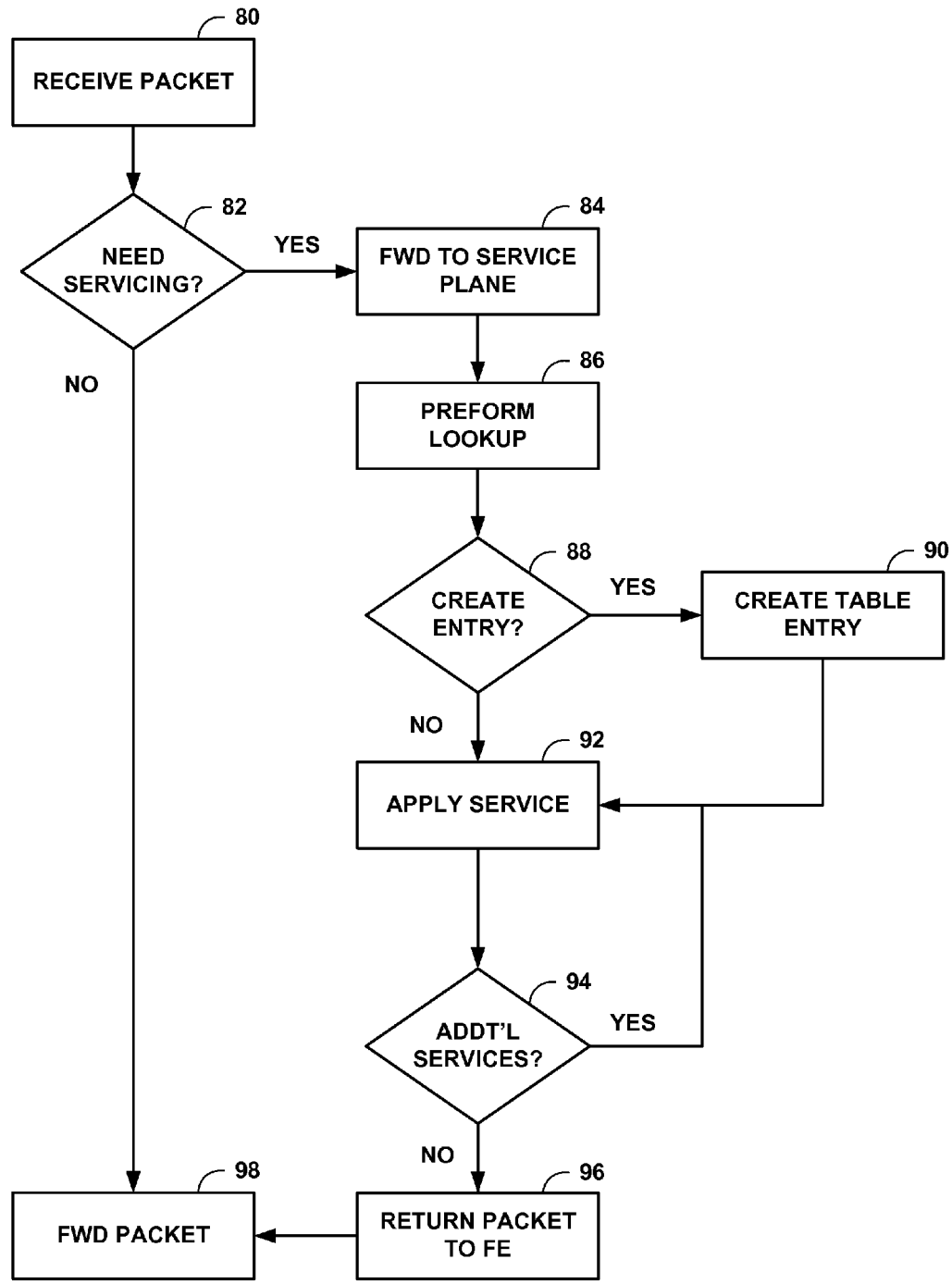
FIG. 4 is a flowchart illustrating an example method for relaying packets over a softwire consistent with this disclosure.

FIG. 4 is a flowchart illustrating an example method for relaying packets over a softwire consistent with this disclosure. For purposes of clarity, the method shown in FIG. 4 will be described with respect to network system 2 of FIG. 1 and the network device 30 of FIG. 2.

Network device 30 receives a packet via one of IFCs 40 and inbound links 41 (80). After network device 30 receives the packet, the one of IFCs 40 directs the packet to forwarding engine 50, which determines applicable forwarding information of FIB 52 or a matching filter 54. Based on the forwarding information or matching filter, forwarding engine determines whether the packet requires servicing (82). If the forwarding information or matching filter specifies a next-hop ("NO" branch of 82), forwarding engine 50 forwards the packet to the corresponding one of IFCs 40 and outbound links 43. If the forwarding information or matching filter specifies a logical interface that corresponds to service plane 38 ("YES" branch of 82), forwarding engine 50 passes the packet to service plane 38 via the logical interface (84).

When the packet is received from residential gateway 16 via provider network 12, the packet comprises an IPv6 packet configured in accordance with the ds-lite approach. As such, controller 56 of service plane 38 examines the IPv6 packet, determines that the packet needs to be serviced by tunnel module 62 of concentrator 58, and passes the packet to tunnel module 62. Tunnel module 62 then performs a lookup in softwire table 66 based on at least the IPv6 source address and the IPv6 destination address (86). If a matching entry is returned, tunnel module 62 does not need to create a new entry in softwire table 66 for the softwire associated with the IPv6 packet ("NO" branch of 88). If no matching entry is returned, tunnel module 62 needs to create a new entry in softwire table 66 for the softwire associated with the IPv6 packet ("YES" branch of 88). Tunnel module 62 creates the new entry by, for example, extracting the IPv6 source address and the IPv6 destination address from the IPv6 packet and storing those values along with a configured default MTU value and the port number on which the IPv6 packet was received in softwire table 66 (90). That is, tunnel module 62 automatically establishes the data flow for the softwire by creating the table entry associated with the softwire without any signaling between the tunnel egress (e.g., residential gateway 16) and the tunnel ingress (e.g., network device 22).

After determining whether a new entry needs to be created in softwire table 66 (88), tunnel module 62 decapsulates the IPv4 packet from the IPv6 packet (92). In one embodiment, tunnel module 62 adjusts the packet size based on the MTU value stored in softwire table 66. In some examples, tunnel module 62 decapsulates the IPv4 packet from the IPv6 packet prior to performing the lookup (86) and determining whether a new entry needs to be created in softwire table 66 (88). Tunnel module 62 then returns the packet to controller 56, which examines the packet to determine if any additional services need to be performed (94).

If additional services need to be performed ("YES" branch of 94), controller 56 passes the packet to the appropriate service module of service plane 38 (e.g., NAT module 64 or one of L3-L7 service modules 60). The appropriate service module then applies the required services (92). In one example, controller 56 determines that the packet requires servicing by NAT module 64 ("YES" branch of 94). Controller 56 then passes the packet to NAT module 64, which applies a NAT rule store in NAT rules 68 to change the IPv4 source address from the private IPv4 address assigned to the subscriber device 18 that created the packet to the public IPv4 address of network device 30 (92).

Returning to step 84, when the packet is received from server 20 via public network 14, the packet comprises an IPv4 packet. As such, controller 56 examines the IPv4 packet, determines that he packet needs to be serviced by NAT module 64, and passes the packet to NAT module 64. NAT module 64 then performs a lookup in NAT rules 68 based on at least the IPv4 source address and the port on which the packet was received by network device 30 to determine the appropriate one of NAT rules to apply to the IPv4 packet (86). Typically, the packet is a response to a packet sent by one of subscriber devices 18 that created the softwire Therefore, a softwire was previously created by tunnel module 62 and an entry in softwire table 66 does not need to be created ("NO" branch of 88). NAT module 64 applies the NAT rule to the packet in order to change the IPv4 destination address of the IPv4 packet to a private IPv4 address (92) and returns the packet to controller 56, which determines if any additional services are required (94).

Because the packet is being forwarded to one of subscriber devices 18 via a softwire, controller 56 determines that additional services are required ("YES" branch of 94) and passes the packet to tunnel module 62. Tunnel module 62 encapsulates the IPv4 packet within an IPv6 packet and sets the IPv6 source address to the IPv6 address of network device 30 and the IPv6 destination address to the IPv6 address of residential gateway 16 (92). After tunnel module 62 encapsulates the IPv4 packet (92), tunnel module 62 returns the packet to controller 56.

When controller 56 determines that no additional services need to be applied ("NO" branch of 94), controller 56 returns the packet to forwarding engine 50 of data plane 36 (96). Forwarding engine 50 inspects the packet to determine the destination of the packet and forwards the packet over the appropriate one of IFCs 40 to a next-hop (e.g., a network device located within public network 14) (98).

Figure 5:
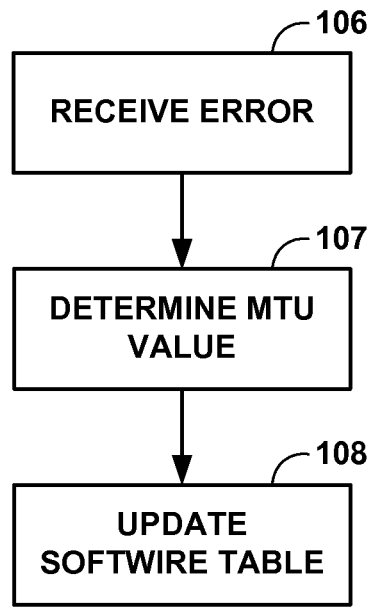
FIG. 5 is a flow chart illustrating an example method for adjusting maximum transmission unit values associated with a softwire in accordance with one aspect of this disclosure.

FIG. 5 is a flow chart illustrating an example method for adjusting maximum transmission unit values associated with a softwire in accordance with one aspect of this disclosure. For purposes of clarity, the method shown in FIG. 5 will be described with respect to network system 2 of FIG. 1 and the network device 30 of FIG. 2.

In some examples, network device 30 receives an ICMP error message after forwarding a packet (106). The ICMP error message is generated by a downstream network device (e.g., a network device in public network 14 where the packet is forwarded from network device 30 towards server 20) when the packet forwarded by network device 30 is larger than permitted by the downstream network device. The downstream network device rejects the packet and generates the ICMP error. The ICMP error typical includes a maximum segment size specified by the downstream network device. Network device 30 examines the ICMP error and determines an updated MTU value (107). When the ICMP error includes a maximum segment size, network device 30 uses the maximum segment size for the MTU value. If the ICMP error does not include a maximum segment size, network device 30 may reduce the MTU value stored in softwire table 66 by a configurable amount when determining the updated MTU value. After determining the updated MTU value (107), network device 30 updates the appropriate row of softwire table 66 with the updated MTU value (108).

Figure 6:
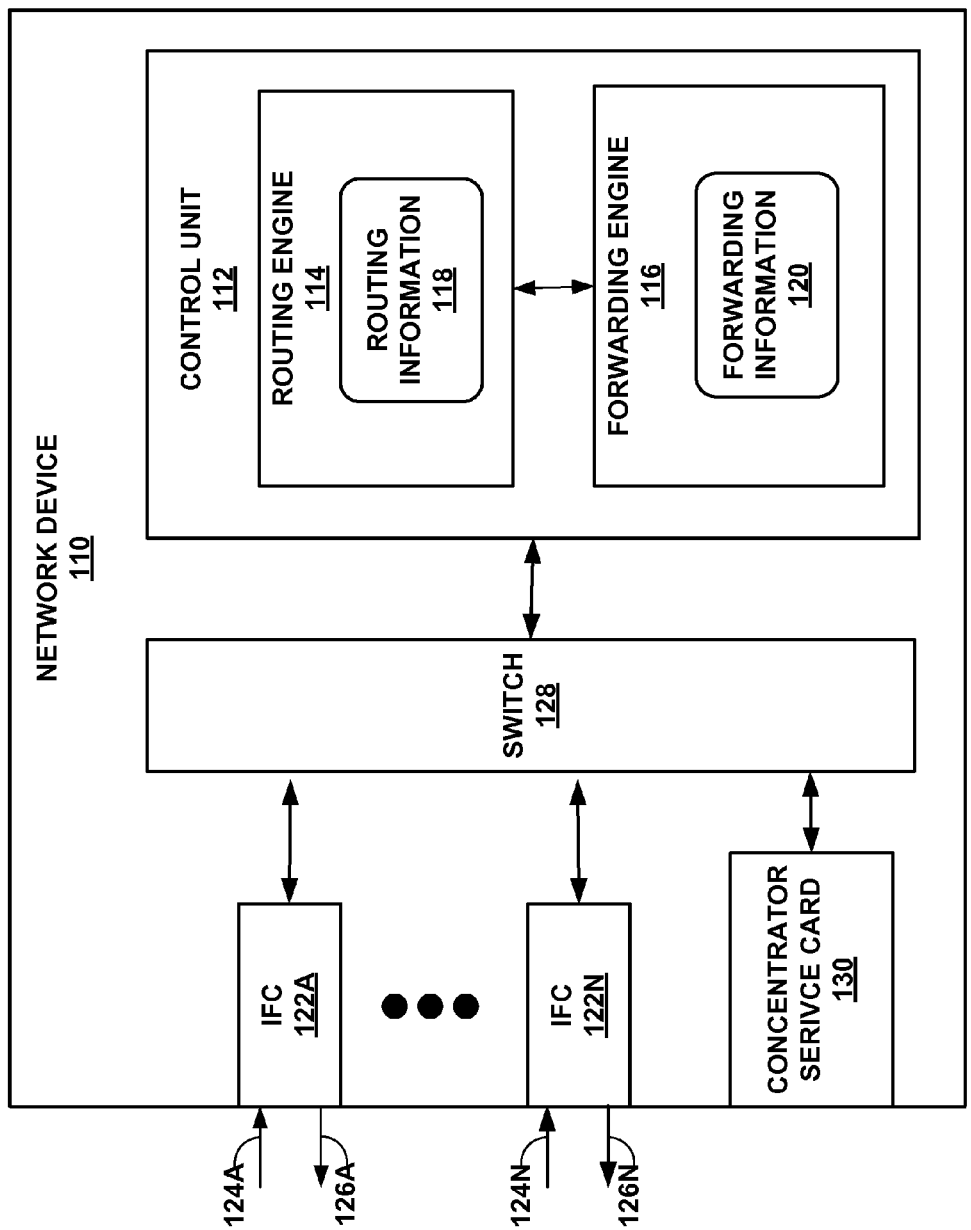
FIG. 6 is a block diagram illustrating another example network device that may implement the techniques of this disclosure.

FIG. 6 is a block diagram illustrating another example network device 110 that may implement the techniques of this disclosure. Although described with respect to network device 110, any network device capable of performing tunneling techniques may implement the techniques described herein and the techniques should not be limited to the example set forth in FIG. 6.

As shown in FIG. 6, network device 110 includes control unit 112 that comprises a routing engine 114 and a forwarding engine 116. Routing engine 114 is primarily responsible for maintaining routing information 118 to reflect the current topology of a network and other network entities to which it is connected. In particular, routing engine 114 maintains routing information 118 to accurately reflect the topology of the network and other entities. In accordance with routing information 118, forwarding engine 116 maintains forwarding information 120 that associates network destinations with specific next hops and corresponding interfaces ports.

Relay 110 includes a set of interface cards (IFCs) 122A-122N ("IFCs 122") for communicating packets via inbound links 124A-124N ("inbound links 124") and outbound links 126A-126N ("outbound links 126"). Each of IFCs 122 couple to and communicate with control unit 112 via switch 128. Switch 128 may comprise any communication medium capable of communicatively coupling one or more endpoints, e.g., IFCs 122, control unit 112, and a concentrator service card 130. Forwarding engine 116 may receive packet forwarded via switch 128 from IFCs 122 and forward those packets via switch 128 and IFCs 122 on outbound links 126 according to forwarding information 120. In this manner, forwarding engine 126 provides the forwarding functionality of network device 110.

Network device 110 also includes above noted concentrator service card 130. In some embodiments, concentrator service card 130 includes modules similar to tunnel module 62 and NAT module 64 shown in FIG. 2. Concentrator service card 130 may be referred to as a service plane entity in that it resides in a service plane separate from the routing and forwarding planes represented by routing engine 114 and forwarding engine 116, respectively. This service plane entity, which is commonly abbreviated as "SPE," may provide an interface by which one or more cards may be inserted into a chassis. Each of these cards may include one or more distributed NAT modules and tunnel modules while the SPE executes the NAT and tunnel modules. Regardless of the implementation details, concentrator service card 130 may implement the techniques described in this disclosure to provide a lightweight tunneling mechanism and to further convert network packets between a first network-layer protocol and a second network-layer protocol, such as may be required when implementing the ds-lite approach.

To illustrate the flow of packets with respect to the exemplary configuration of network device 110, assume network device 110 replaces network device 22 of FIG. 1 and that one of IFCs 122, e.g., IFC 122A, may receive an output packet originated by one of subscriber devices 18, e.g., subscriber device 18A. IFC 122A forwards this packet to forwarding engine 126 via switch 128, where forwarding engine 126 forwards this packet to concentrator service card 130. Upon applying the tunnel and NAT services to the packet in accordance with the techniques of this disclosure as described in more detail above, concentrator service card 130 forwards the modified packet generated as a result of performing these techniques back to forwarding engine 126. Forwarding engine 156 then forwards this modified packet via an appropriate one of IFCs 122 as specified by forwarding information 120.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the invention have been described. These and other embodiments are within the scope of the following claims.

The invention claimed is:

1. A method comprising:
  receiving, with a network device, a packet having header information via a tunnel of a plurality of tunnels over a first network, wherein two or more tunnels of the plurality of tunnels are associated with different subscribers, wherein the packet conforms to a first network-layer protocol, and wherein the network device is connected to the first network operating in accordance with the first network-layer protocol and a second network operating in accordance with a second network-layer protocol;
  accessing, with a forwarding element of the network device, a forwarding structure to select a logical interface to which to forward the packet based on the header information, wherein the logical interface is associated with a service element of the network device, and wherein the logical interface is associated with each of the two or more tunnels associated with the different subscribers;
  directing the packet to the service element with the forwarding element of the network device via the logical interface;
  determining, with the service element, if an entry exists within a data repository of the network device that includes information about the tunnel based on at least the header information of the packet;
  in response to determining that the entry does not exist, creating, with the service element, the entry in the data repository to store information associated with the tunnel in order to establish the tunnel without signaling of the tunnel as a tunnel egress device;
  transforming, with the service element, the packet from a format conforming with the first network-layer protocol to a format conforming with the second network-layer protocol based on the entry;
  directing the packet from the service element to the forwarding element; and
  forwarding the packet via the second network with the forwarding element.

2. The method of claim 1, further comprising:
  receiving, with the network device, a second packet having header information via the second network, wherein the second packet conforms to the second network-layer protocol;
  directing the second packet to the service element with the forwarding element;
  transforming, with the service element, the second packet from a format conforming with the second network-layer protocol to a format conforming with the first network-layer protocol,
  wherein transforming the second packet comprises:
    applying a network address translation rule to the second packet to change network address information stored within header information of the second packet; and
    encapsulating the second packet within a third packet, wherein the third packet conforms to the first network-layer protocol;
  directing the third packet from the service element to the forwarding element; and
  forwarding the third packet via a second tunnel over the first network with the forwarding element.

3. The method of claim 2, wherein applying the network address translation rule to the second packet comprises changing a public network address stored within the header information of the second packet to the private network address.

4. The method of claim 1, wherein transforming the packet from a format conforming with the first network-layer protocol to a format conforming with the second network-layer protocol further comprises:
  decapsulating the packet to extract another packet having header information, wherein the other packet conforms to the second network-layer protocol; and
  applying a network address translation rule to the other packet to change network address information stored within the header information of the other packet.

5. The method of claim 4, wherein the network address translation rule changes the network address information from a private network address to a public network address of the network device.

6. The method of claim 1, further comprising:
  after forwarding the packet, receiving an error message corresponding to the packet from another network device located within the second network; and changing a maximum transmission unit value stored in the entry of the data repository associated with the tunnel based on the error message.

7. The method of claim 1, wherein the first network-layer protocol is Internet Protocol version 6 (IPv6), and wherein the second network-layer protocol is Internet Protocol version 4 (IPv4).

8. The method of claim 1, further comprising:
applying, with the service element, one or more layer three through layer seven services to the packet prior to directing the packet from the service element to the forwarding element, wherein the layer three through layer seven services comprise security, firewall, class of service, and stateful packet inspection.

9. A network system comprising:
a first set of network interfaces configured to send and receive packets with a first network operating in accordance with a first network-layer protocol;
a second set of network interfaces configured to send and receive packets with a second network operating in accordance with a second network-layer protocol;
a data repository configured to store information about a plurality of tunnels, wherein two or more tunnels of the plurality of tunnels are associated with different subscribers;
a forwarding structure having a plurality of entries that each refers to one of a plurality of logical interfaces;
a service element configured to apply one or more services to the received packets; and
a forwarding element configured to receive a first packet having header information via a tunnel over the first network with one of the first set of networking interfaces, access the forwarding structure to select a logical interface to which to forward the packet based on the header information, wherein the logical interface is associated with each of the two or more tunnels associated with the different subscribers, pass the first packet to the service element via the logical interface, receive a second packet from the service element, and forward the second packet via the second set of network interfaces to the second network, wherein the first packet conforms to the first network-layer protocol, and wherein the second packet conforms to the second network-layer protocol,
wherein the service element is configured to, responsive to receiving the first packet from the forwarding element, determine if an entry exists within the data repository that includes information about the tunnel based on at least the header information, in response to determining that the entry does not exist, creating the entry in the data repository to store information associated with the tunnel in order to establish the tunnel without signaling of the tunnel as transform the first packet from a format conforming with the first network-layer protocol into the second packet having a format conforming with the second network-layer protocol based on the entry based on the retrieved entry, and direct the second packet to the forwarding element.

10. The network system of claim 9,
wherein the forwarding element receives a third packet having header information via the second set of network interfaces and the second network,
wherein the third packet conforms to the second network-layer protocol,
wherein the service element further comprises:
a network address translation module configured to apply a network address translation rule to a third packet to change network address information stored within header information of the third packet, wherein the third packet is received with the second set of network interfaces via the second network, wherein the third packet conforms to the second network-layer protocol; and
a tunnel module configured to encapsulate the third packet within a fourth packet,
wherein the fourth packet conforms to the first network-layer protocol, and
wherein the forwarding element forwards the fourth packet via a second tunnel over the first network.

11. The network system of claim 10, wherein the network address translation module is configured to apply the network address translation rule to change a public network address stored within the header information of the third packet to the private network address.

12. The network system of claim 9, wherein the service element further comprises:
a tunnel module configured to decapsulate the first packet to extract the second packet having header information, wherein the second packet conforms to the second network-layer protocol; and
a network address translation module configured to apply a network address translation rule to the second packet to change network address information stored within the header information of the second packet.

13. The network system of claim 12, wherein the network address translation rule changes the network address information from a private network address to a public network address of the network device.

14. The network system of claim 9, further comprising:
a control unit configured to, after the forwarding element forwards the second packet via the second network, receive an error message corresponding to the second packet from another network device located within the second network, and change an MTU value stored in the entry of the data repository that includes information about the tunnel based on the error message.

15. The network system of claim 9, wherein the first network-layer protocol is Internet Protocol version 4 (IPv4), and wherein the second network-layer protocol is Internet Protocol version 6 (IPv6).

16. The network system of claim 9, wherein the service element comprises at least one of a software module executing on the network device, a hardware module installed within the network device, and an external device coupled to the network device.

17. The network system of claim 9, wherein the service element further comprises:
a set of service modules configured to apply one or more layer three through layer seven services to the first packet or the second packet prior to the service element directing the second packet to the forwarding element.

18. A non-transitory computer-readable storage medium encoded with instructions that cause one or more programmable processors of a network device to: receive a packet having header information via a tunnel of a plurality of tunnels over a first network, wherein two or more tunnels of the plurality of tunnels are associated with different subscribers, and wherein the packet conforms to a first network-layer protocol, and wherein the first network operates in accordance with a first network-layer protocol; access a forwarding structure stored with the network device to select a logical interface to which to forward the packet based on the header information, wherein the logical interface is associated with a service element of the network device, and wherein the logical interface is associated with each of the two or more tunnels associated with the different subscribers; direct the packet to the service element of the network device via the logical interface; determine if an entry exists within a data repository that includes information about the tunnel based on at least the header information; in response to determining that the entry does not exist, create the entry in the data repository to store information associated with the tunnel in order to establish the tunnel without signaling of the tunnel with a tunnel egress device; transform the packet from a format conforming with the first network-layer protocol to a format conforming with a second network-layer protocol based on the entry; direct the packet from the service element to a forwarding element of the network device; and forward the packet via a second network, wherein the second network operates in accordance with the second network-layer protocol.

19. A non-transitory computer-readable storage medium of claim 18, further encoded with instructions that cause the one or more programmable processors to: receive a second packet having header information via the second network, wherein the second packet conforms to the second network-layer protocol; direct the second packet to the service element with a forwarding element of the network device via the logical interface; transform the second packet from a format conforming with the second network-layer protocol to a format conforming with the first network-layer protocol by at least causing the one or more programmable processor to: apply a network address translation rule to the second packet to change network address information stored within header information of the second packet; and encapsulate the second packet within a third packet, wherein the third packet conforms to the first network-layer protocol; direct the third packet from the service element to the forwarding element; and forward the third packet via a second tunnel over the first network.

20. A non-transitory computer-readable storage medium of claim 19, further encoded with instructions that cause the one or more programmable processors to: apply one or more layer three through layer seven services to the packet prior to directing the packet from the service element to the forwarding element, wherein the layer three through layer seven services comprise security, firewall, class of service, and stateful packet inspection.

21. A method comprising:
receiving, with a forwarding element of a network device, packets from a plurality of different subscribers via a plurality of tunnels over a first network, wherein each of the packets includes respective header information, and wherein each of the packets conforms to a first network-layer protocol, wherein each of the plurality of tunnels corresponds to a respective one of the plurality of different subscribers, and wherein the network device is connected to the first network operating in accordance with the first network-layer protocol and a second network operating in accordance with a second network-layer protocol;
forwarding, with the forwarding element, each of the packets to a service element of the network device via a common logical interface, wherein the common logical interface is associated with each of the plurality of tunnels;
accessing a data repository of the network device to determine whether any of the tunnels by which the packets were received from the plurality of different subscribers are new tunnels for which packets have not yet been received and that have not been signaled by the network device;
dynamically updating, with the service element, entries within the data repository of the service element to store information for each of the tunnels determined to be new tunnels without signaling the new tunnels within the first network; and
transforming, with the service element, each of the packets from a format conforming with the first network-layer protocol to a format conforming with the second network-layer protocol based at least in part on the respective header information.

* * * * *